UNITED STATES PATENT OFFICE 2,675,392

ADDITION PRODUCTS OF THIOLS TO DIKETENE AND THEIR PREPARATION

Clement W. Theobald, Wilmington, Del., assignor to E. I. du Pont de Nemours and Company, Wilmington, Del., a corporation of Delaware No Drawing. Application January 4, 1951, Serial No. 204,498

27 Claims. (Cl. 260—343.9)

This invention relates to the addition of thiols to beta-methylene-beta-propiolactone and to the products obtained by this reaction.

The preparation of beta-methylene-beta-propiolactone,

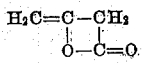

or diketene, is described in "Organic Reactions" John Wiley and Sons (1946), vol. III, pages 127 to 135. This compound possesses a vinylidene group and should be readily polymerizable to a high polymer. However, free radical catalysts have not been reported to form high molecular weight polymers from the monomer. Hence, the compound has been assumed not to be susceptible to other free radical catalyzed reactions.

It is an object of this invention to provide new addition products of thiols to diketene (beta-methylene-beta-propiolactone). A further object is to provide a novel catalytic method for the preparation of monomeric addition products of thiols to diketene. Other objects will appear hereinafter.

This invention comprises, as a novel class of products, beta-propiolactones having an organic sulfide group attached to a carbon atom which is at most one carbon removed from the propiolactone ring. It has now been found that diketene will react, in the presence of a free-radical producing catalyst, with an organic compound that is free from aliphatic carbon-to-carbon unsaturation and contains a thiol group, i. e., an aliphatically saturated thiol, to produce a monomeric addition product.

In the case of the reaction of beta-methylene-beta-propiolactone with a dithiol such as ethane dithiol, the product has the formula

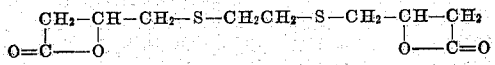

The following examples in which the parts are by weight further illustrate this invention.

Example I

A solution of 50 parts of diketene in 200 parts of cyclohexane was cooled to the freezing point of the mixture. One part of alpha, alpha'-azodiisobutyronitrile was dissolved in this reaction mixture and 23.5 parts of ethane dithiol dissolved in 39 parts of cyclohexane was added dropwise while the mixture was irradiated by means of a sun lamp. Addition of the thiol to the stirred reaction mixture required one hour and stirring in an ice-bath was continued for an additional hour.

The mixture was filtered and 58.2 parts (89% conversion) of a white solid (melting at 93–96° C. with decomposition) was obtained. Recrystallization from acetone removed a minor amount of insoluble and rubbery polymeric material. After recrystallization, the melting point of the monomeric addition product was 119°–120° C. (decomp.).

Anal. Calc. for $C_{10}H_{14}O_4S_2$: S, 24.44. Found: S, 24.30, 24.32.

The basis for the structural formula assigned to this material is supported by the following facts. The infrared spectrum shows absorption at 5.50 microns. This band has been assigned to the lactone carbonyl since it is present in the spectra of both beta-propiolactone and diketene. No absorption at the wave lengths appropriate to ester, aldehyde, ketone or acid carbonyl groups occurred. The material was insoluble in cold 0.1 N. sodium hydroxide but dissolved upon warming and 1 mole of material reacted with 2 moles of sodium hydroxide. Cooling this warm alkaline solution or acidification did not precipitate the original substance. Distillation of the alkaline solution yielded no detectable alcoholic or carbonyl compounds. Upon acidification of this alkaline solution and distillation, no ethane dithiol could be detected in the distillate by means of reaction with benzoyl chloride and alkali, and only traces of thiol groups were present as determined by reaction with iodine. An acetone solution of the material did not decolorize potassium permanganate. A carbon tetrachloride solution of bromine (or an aqueous solution of bromine or an aqueous solution of iodine) did not react with the substance.

These facts indicate the presence of a lactone group, two saponifiable groups per molecule, the absence of thiol groups or unsaturation and the structure

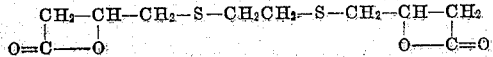

Example II

An initiator solution was prepared composed of 360 parts of dioxane, 350 parts of water, 20 parts of an aqueous solution containing 0.43 part of ammonium persulfate and 0.02 part of copper sulfate tetrahydrate and 20 parts of an aqueous solution containing 0.162 part of sodium meta-bisulfite. This reaction mixture was cooled to 0° C. and 84 parts of diketene added with stirring. While stirring was continued, 47 parts of ethane dithiol was added dropwise maintaining the temperature at 0 to −5° C. The addition required 1½ hrs. and the reaction mixture was stirred for an additional 1½ hrs. at low temperature. The solid mixture was removed by filtration and filter cake washed with petroleum ether followed by washing with carbon tetrachloride. Air dry weight of the product so obtained was 54 parts (41% conversion); an additional quantity (33.5 parts) of solid, mostly polymeric, separated from the filtrate upon standing at room temperature. The initial product was dissolved in acetone and filtered from 7.7 parts of polymeric insoluble material which was discarded. Isolation of the material from the acetone solution by crystallization yielded 29.85 parts of material melting at 120–124° C. and additional quantities of lower melting less pure materials were obtained by concentration. Further purification was effected with very little loss and a melting point of 128–129° C. was obtained which did not change upon further purification. This material was shown to be identical with the product of Example I by a mixed melting point of the two samples after further purification of the latter.

The less pure fractions contained only slightly more sulfur (24.97, 28.98%) than the more highly purified material.

*Example III*

A solution of 3 parts of 1-thiosorbitol, 15 parts of diketene and 155 parts of dioxane was heated to 80° C. for 25 minutes. A total of 0.1 part of alpha,alpha'-azodiisobutyronitrile was added and heating continued for six hours. Upon cooling and evaporating excess diketene and dioxane, a viscous oil was obtained which contained no thiol groups. The probable formula for this product is

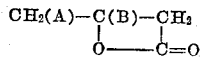

where one of the groups A and B is hydrogen and the other of said groups is

CH₂OH(CHOH)₄CH₂S—

The reaction of the present invention requires the presence of a free radical type catalyst, or initiator. In view of the wide spread use of these catalysts in the polymerization art, a free radical producing catalyst can be readily selected by any one skilled in polymerization and other free-radical catalyzed reactions. By way of example the following catalysts may be used: peroxygen catalysts including diacyl peroxides such as benzoyl peroxide, alkyl peroxides such as tertiary butyl hydroperoxide, inorganic peroxides such as hydrogen peroxide, salts of peracids such as ammonium persulfate, azo catalysts of the type described in Hunt U. S. Patent 2,471,959 including carbamylazoisobutyronitrile, alpha,alpha' - azobis - (alpha,gamma - dimethylvaleronitrile), dimethyl alpha,alpha'-azodiisobutyrate, combinations of oxidizing-reducing agents such as hydrogen peroxide/hydrazines, titanous or vanadous salts with a peroxide, and thiourea/hydrogen peroxide.

The proportion of catalyst may vary within relatively wide limits depending largely upon the relative activity of the catalyst, temperature, time, etc. Advantageous results are sometimes obtained by using a combination of catalysts. In general the amount of catalyst present can vary within the range of 0.001 to 10% by weight of the diketene employed. Preferably the amount is 0.01 to 5%.

Operating conditions may vary. In general the addition is effected in inert organic solvents such as dioxane, cyclohexane or in aqueous media, particularly when water soluble catalysts are employed. The time required for the reaction depends in general upon the activity of the catalyst at the temperatures employed. In general the time required is from a few minutes to several hours.

High temperatures should be avoided. The reaction temperature in general should be maintained below 80° C. and preferably below 50° C. Most suitable temperatures are −50° C. to 25° C.

The thiols that are useful in the process of this invention are compounds which contain one or more SH groups attached to carbon. These include methyl mercaptan, octadecyl mercaptan, decane-1,10-dithiol, pinanethiol, ethane dithiol, butane dithiol, 1-thiosorbitol, thioacetic and thioglycollic acids, thiophenol, thiourea, mercaptobenzothiazole, and the like. Preferred thiols are the saturated aliphatic thiols, particularly the saturated aliphatic hydrocarbon thiols, containing one to two thiol groups and up to 18 carbon atoms.

The products of this invention are beta-propiolactone which contain a sulfide group. They have the general formula

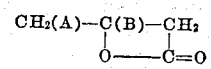

wherein one of the groups A and B is hydrogen and the other is a saturated organic sulfide radical. The preferred products are those wherein one of the groups A and B is hydrogen and the other of said groups A and B is selected from the class consisting of

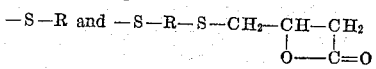

wherein R is an aliphatically saturated hydrocarbon or hydroxyalkyl radical of up to 18 carbon atoms. Particularly preferred products are those where R is alkyl or hydroxyalkyl in —S—R and where R' is a divalent alkylene radical in

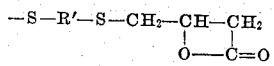

When a dithiol is employed, the compound obtained is a sulfide containing two sulfide groups of the formula

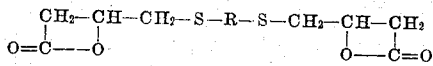

wherein R is a hydrocarbon divalent radical of generally 2 to 10 carbons and particularly a saturated hydrocarbon divalent radical.

The products of this invention when a monothiol is used are monolactones which are useful in biologicals. Polylactones, obtained from the reaction of a monomeric polythiol with diketene, are polymer intermediates and as such are useful in the preparation of polyamides.

As many apparently widely different embodiments of this invention may be made without departing from the spirit and scope thereof, it is to be understood that this invention is not limited to the specific embodiments thereof except as defined in the appended claims.

I claim:

1. A compound having the general formula

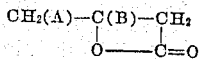

wherein B is hydrogen and A is —SR in which R is an alkyl radical of up to 18 carbon atoms.

2. A compound having the general formula

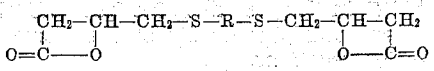

wherein R is a divalent alkylene radical of 2 to 10 carbon atoms.

3. The chemical compound having the formula

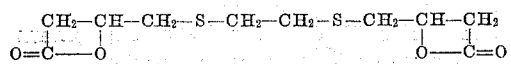

4. A process which comprises reacting diketene with a saturated aliphatic hydrocarbon thiol containing one to two thiol groups and up to 18 carbon atoms at a temperature from 80° to −50° C. in the presence of a free-radical producing catalyst capable of catalyzing polymerization reactions.

5. A process which comprises reacting diketene with an alkyl monothiol containing up to 18 carbon atoms at a temperature from 50° to −50° C. in the presence of a free-radical producing catalyst capable of catalyzing polymerization reactions.

6. A process which comprises reacting diketene with an alkylene dithiol containing 2 to 10 carbon atoms at a temperature from 50° to −50° C. in the presence of a free-radical producing catalyst capable of catalyzing polymerization reactions.

7. A process which comprises reacting diketene with ethane dithiol at a temperature from 50° to −50° C. in the presence of a free-radical producing catalyst capable of catalyzing polymerization reactions.

8. A process which comprises reacting diketene with 1-thiosorbitol at a temperature from 80° C. to −50° C. in the presence of a free-radical producing catalyst capable of catalyzing polymerization reactions.

9. A compound having the general formula

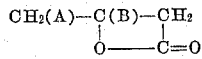

wherein B is hydrogen and A is —SR in which R is a hydroxyalkyl radical of up to 18 carbon atoms in which only one hydroxyl group is attached to any one carbon atom.

10. A compound having the formula

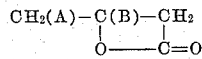

where B is hydrogen and A is

CH₂OH(CHOH)₄CH₂S—

11. A compound having the general formula

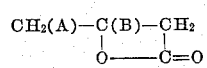

wherein B is hydrogen and A is selected from the class consisting of

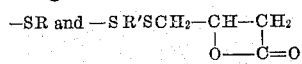

in which R is selected from the class consisting of alkyl radicals of up to 18 carbon atoms and hydroxyalkyl radicals of up to 18 carbon atoms in which only one hydroxyl group is attached to any one carbon atom and R' is a divalent alkylene radical of 2 to 10 carbon atoms.

12. A process which comprises reacting diketene, at a temperature from 80° to −50° C. in the presence of a free-radical producing catalyst capable of catalyzing polymerization reactions, with a thiol selected from the class consisting of saturated aliphatic hydrocarbon thiols containing one to two thiol groups and up to 18 carbon atoms and hydroxyalkyl monothiols of up to 18 carbon atoms in which only one hydroxyl group is attached to any one carbon atom.

13. A process which comprises reacting diketene, at a temperature from 80° to −50° C. in the presence of a free-radical producing azo catalyst capable of catalyzing polymerization reactions, with a thiol selected from the class consisting of saturated aliphatic hydrocarbon thiols containing one to two thiol groups and up to 18 carbon atoms and hydroxyalkyl monothiols of up to 18 carbon atoms in which only one hydroxyl group is attached to any one carbon atom.

14. A process which comprises reacting diketene, at a temperature from 80° to −50° C. in the presence of a free-radical producing peroxygen catalyst capable of catalyzing polymerization reactions, with a thiol selected from the class consisting of saturated aliphatic hydrocarbon thiols containing one to two thiol groups and up to 18 carbon atoms and hydroxyalkyl monothiols of up to 18 carbon atoms in which only one hydroxyl group is attached to any one carbon atom.

15. A process which comprises reacting diketene with a saturated aliphatic hydrocarbon thiol containing one to two thiol groups and up to 18 carbon atoms at a temperature from 80° to −50° C. in the presence of a free-radical producing azo catalyst capable of catalyzing polymerization reactions.

16. A process which comprises reacting diketene with a saturated aliphatic hydrocarbon thiol containing one to two thiol groups and up to 18 carbon atoms at a temperature from 80° to −50° C. in the presence of a free-radical producing peroxygen catalyst capable of catalyzing polymerization reactions.

17. A process which comprises reacting diketene with an alkyl monothiol containing up to 18 carbon atoms at a temperature from 50° to −50° C. in the presence of a free-radical producing azo catalyst capable of catalyzing polymerization reactions.

18. A process which comprises reacting diketene with an alkyl monothiol containing up to 18 carbon atoms at a temperature from 50° to −50° C. in the presence of a free-radical producing peroxygen catalyst capable of catalyzing polymerization reactions.

19. A process which comprises reacting diketene with an alkylene dithiol containing 2 to 10 carbon atoms at a temperature from 50° to −50° C. in the presence of a free-radical producing azo catalyst capable of catalyzing polymerization reactions.

20. A process which comprises reacting diketene with an alkylene dithiol containing 2 to 10 carbon atoms at a temperature from 50° to −50° C. in the presence of a free-radical producing peroxygen catalyst capable of catalyzing polymerization reactions.

21. A process which comprises reacting diketene with a hydroxyalkyl monothiol containing up to 18 carbon atoms in which only one hydroxyl group is attached to any one carbon atom at a temperature from 80° to −50° C. in the presence of a free-radical producing catalyst capable of catalyzing polymerization reactions.

22. A process which comprises reacting diketene with a hydroxyalkyl monothiol containing up to 18 carbon atoms in which only one hydroxyl group is attached to any one carbon atom at a temperature from 80° to −50° C. in the presence of a free-radical producing azo catalyst capable of catalyzing polymerization reactions.

23. A process which comprises reacting diketene with a hydroxyalkyl monothiol containing up to 18 carbon atoms in which only one hydroxyl group is attached to any one carbon atom at a temperature from 80° to −50° C. in the presence of a free-radical producing peroxygen catalyst capable of catalyzing polymerization reactions.

24. A process which comprises reacting diketene with ethane dithiol at a temperature from 25° to −50° C. in the presence of a free-radical producing azo catalyst capable of catalyzing polymerization reactions.

25. A process which comprises reacting diketene with ethane dithiol at a temperature from 25° to −50° C. in the presence of alpha,alpha'-azodiisobutyronitrile as catalyst.

26. A process which comprises reacting diketene with 1-thiosorbitol at a temperature from 80° to −50° C. in the presence of a free-radical producing azo catalyst capable of catalyzing polymerization reactions.

27. A process which comprises reacting diketene with 1-thiosorbitol at a temperature from 80° to −50° C. in the presence of alpha,alpha'-azodiisobutyronitrile as catalyst.

References Cited in the file of this patent

UNITED STATES PATENTS

| Number | Name | Date |
|---|---|---|
| 2,284,896 | Hanford | June 2, 1942 |
| 2,449,992 | Gresham et al. | Sept. 28, 1948 |
| 2,455,731 | Caldwell | Dec. 7, 1948 |

OTHER REFERENCES

Ind. and Eng. Chem., vol. 32, No. 1, pp. 16–22; 1940.